March 31, 1959 R. P. SNODGRASS 2,880,414
NAVIGATION AID FOR PILOTED AIRCRAFT
Filed April 23, 1956 3 Sheets-Sheet 1

INVENTOR
REUBEN P. SNODGRASS
BY
ATTORNEY

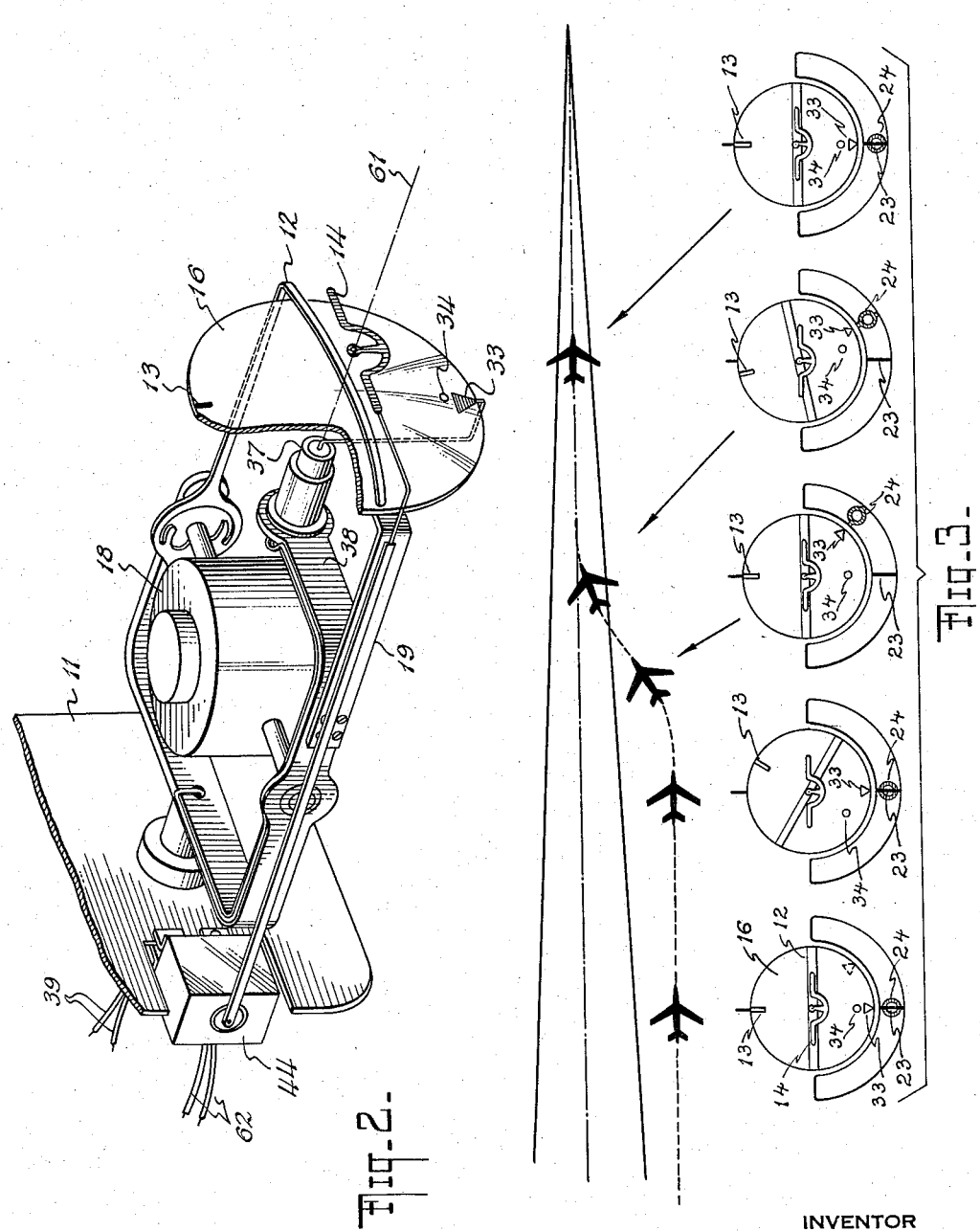

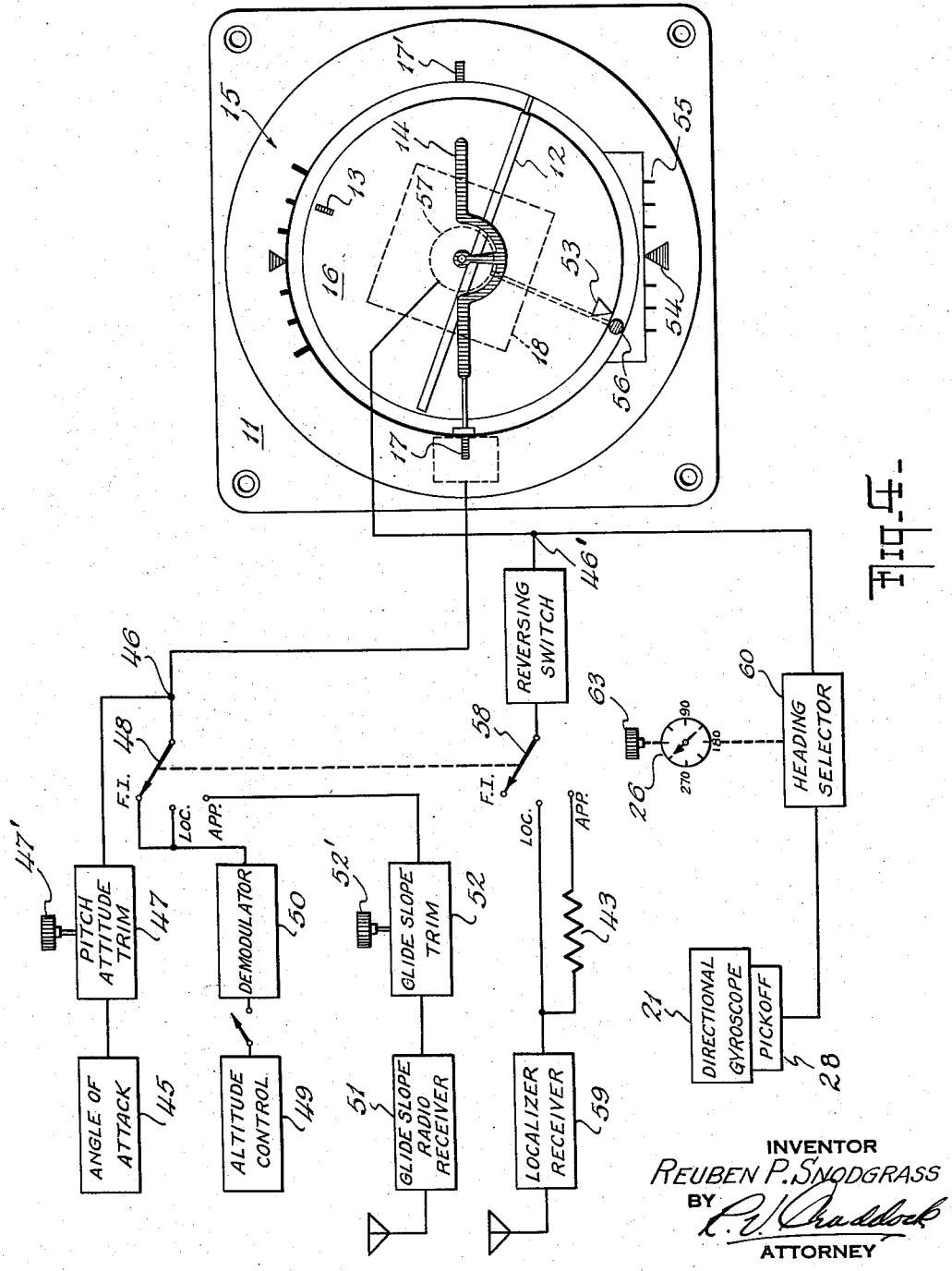

United States Patent Office 2,880,414
Patented Mar. 31, 1959

2,880,414

NAVIGATION AID FOR PILOTED AIRCRAFT

Reuben P. Snodgrass, Lake Ronkonkoma, N.Y., assignor to Sperry Rand Corporation, a corporation of Delaware Application April 23, 1956, Serial No. 580,115

20 Claims. (Cl. 343—107)

This invention relates to craft guidance systems and has reference more particularly to a visual flight indicating system for aircraft guided by human pilots. The invention is concerned with an improved combination of indexes which function cooperatively to aid the pilot in guiding the craft towards a preselected flight path, usually defined by a radio craft guidance system beam.

The present invention contemplates the utilization of a conventional radio craft guidance system in which radio signals define a beam or radio flight path in space. Conventional radio navigation systems produce beams that are disposed in vertical planes or at planes inclined at an acute angle with relation to the earth's surface for aircraft navigation or approach purposes. The bearing of the centerline of a vertical radio beam defines a radio flight path in azimuth. The slope of the centerline of an inclined radio beam may define a glide path for landing purposes.

If the aircraft is proceeding along one course or ground track in azimuth or along one flight path with respect to the earth's horizon, the pilot may wish the aircraft to assume a new heading coinciding with the centerline of a radio beam in a vertical plane, or he may wish to assume a new flight path angle coinciding with the centerline of an inclined radio beam. He would ordinarily determine the azimuth angle of the radio beam by reference to an appropriate map; the slope of the glide slope beam being ordinarily a fixed angle known to the pilot. Under such conditions, it is desirable that the pilot be provided with an instrument which will guide him in maneuvering the craft from one heading or flight path angle to the next.

Accordingly, it is the object of this invention to provide an instrument which will present cooperative indexes positionable in accordance with radio and attitude signals and which will, in response to a command for a new heading corresponding to the azimuth of the centerline of a radio beam, guide the pilot, by his maintaining such indexes in alignment, in maneuvering the aircraft for an asymptotic approach to the new heading.

It is a further object of this invention to provide an instrument showing cooperative indexes positionable in accordance with radio and attitude signals which will guide the pilot in response to a command with respect to pitch attitude along a selected flight path coinciding with the centerline of a radio glide slope beam or with a new altitude by the pilot's maintaining alignment or a predetermined difference of alignment between the indications of pitch attitude and angle of attack in combination with a radio signal or altitude signal.

Effecting flight maneuvers toward a radio-defined flight path might be operatively difficult and complex due to the necessity of observing and reading a multiplicity of instruments which present different types of information that must be consistently and simultaneously interpreted by the pilot.

Accordingly, it is still another object of this invention to combine flight information in a unitary instrument to facilitate the execution of precision flight maneuvers from one flight path to another, usually radio defined, by flying the aircraft so as to maintain alignment between the indications presented on the instrument.

The foregoing and other objects are achieved in accordance with the teachings of a preferred embodiment of the present invention by the provision of an aircraft flight indicator having a rotatable compass card on which may be set an index representing a desired heading. Cooperating with said compass card as by concentric mounting is another element positionable in accordance with the roll attitude of the aircraft and the movement of the craft with respect to the centerline of a radio beam. By controlling the roll attitude of the aircraft to effect said desired heading, a substantially asymptotic path of flight to the desired heading will be obtained.

This invention also teaches the provision of an instrument having an index indicating the attitude of the aircraft in pitch which index cooperates with another correspondingly mounted index indicating the angle of attack of the aircraft with which may be algebraically combined the displacement of the aircraft from the glide slope beam or from a desired altitude. Thus a flight indicating system may be formed which is an improvement over my copending application Serial No. 403,018 for Flight Indicating System filed on January 8, 1954 and assigned to the same assignee as the present invention.

Additional features and advantages of the present invention will appear more fully from an understanding of the theory of operation of the embodiments of the invention illustrated in the drawings in which:

Fig. 2 is a perspective view showing the mounting of the roll stabilized meter movement and the moveable indexes in relation to the vertical gyroscope;

Figure 1:
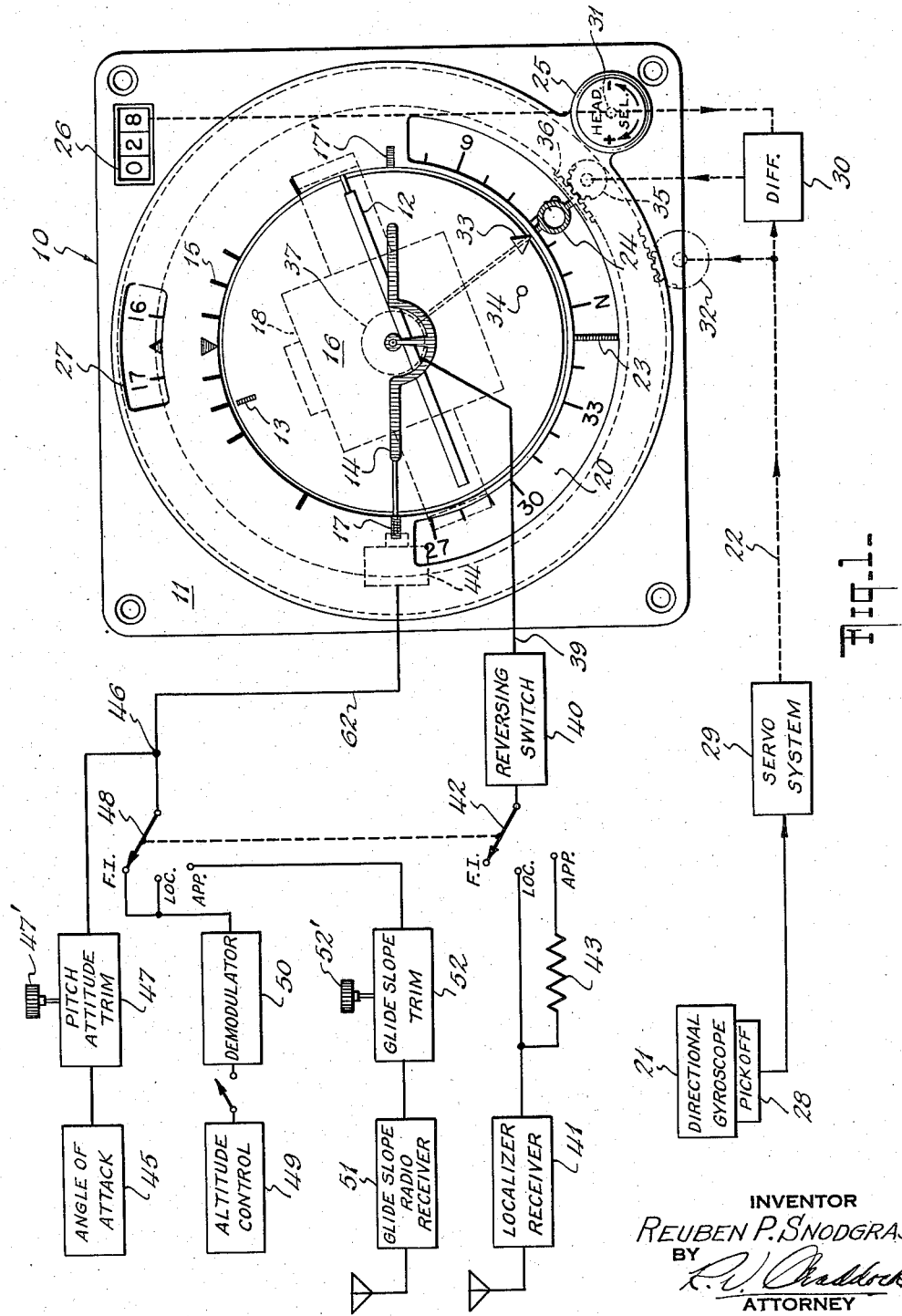
Fig. 1 is a schematic diagram of a flight indicating system arranged in accordance with the present invention.

Fig. 3 is a pictorial view of typical progressive attitudes of an aircraft during the execution of the flight from an existing heading to a newly selected radio-defined heading and the corresponding progressive flight indications of a flight instrument arranged to operate in accordance with the present invention; and Fig. 4 is a schematic diagram of another embodiment of the present invention in the form of a flight indicating system.

For an understanding of a preferred embodiment of the present invention, reference is made to Figs. 1 and 2, which show a flight indicating instrument comprising a casing fixed to the aircraft. The instrument presentation as viewed by the pilot of the craft shows a rotatable compass card which may be concentrically mounted with relation to a longitudinal axis of the aircraft.

A fixed vertical reference or lubber line is cooperable with the compass card and indicates the actual heading of the aircraft. A heading selector index is cooperable with the compass card and with the lubber line to indicate the desired heading and heading error, respectively. The heading selector index may be manually positioned to indicate a desired heading. Both the compass card and heading selector index are actuated by signals from a directional reference and the movement of the heading selector index is synchronized with the movement of the rotatable compass card.

Cooperable with said heading selector index is a steering pointer index positionable in one embodiment of the invention in accordance with the bank angle of the aircraft and the movement of the aircraft with respect to a radio-defined ground track. The term "movement of the craft" with respect to a radio-defined ground track or radio beam, includes the lateral displacement of the craft with respect to said reference and may also include higher derivatives thereof. Positioning the steering pointer index in the present embodiment of the invention is accomplished by coupling the steering pointer index to a motive means mounted on the roll gimbal of a vertical gyro. The motive means rotates with the roll gimbal in accordance with the bank angle of the craft. The motive means is itself responsive to signals that are proportional to the position and movement of the craft with respect to a radio-defined flight path and actuates the steering pointer index in accordance therewith. By mounting the motive means on the roll gimbal of the vertical gyro, the movement of the roll gimbal due to banking of the plane is also transmitted to and actuates the steering pointer index.

The direction of movement of the steering pointer index is dependent upon the position of the craft with respect to a desired radio-defined ground track and the direction of the bank angle of the aircraft. The magnitude and rate of displacement of the index is dependent upon the movement of the craft with respect to the desired ground track and the magnitude of the bank angle.

By suitable construction, the several indexes may be cooperative such that by maintaining alignment of the steering pointer index and the heading selector index during progressive attitude changes caused by banking of the aircraft towards a new heading until the heading selector index, the desired heading indicated on the compass card and the steering pointer index are aligned with the lubber line, an asymptotic approach to a newly selected, radio-defined ground track may be achieved.

Referring now to Figs. 1 and 2, for a detailed description of the structure of a preferred embodiment of the invention, the flight indicating instrument 10 comprises a casing 11 fixed to the airplane. Within the casing 11 is a vertical gyroscope 18 having a vertical spin axis and mounted on a transverse horizontal axis in roll gimbal 38 which in turn is adapted for movement about a longitudinal horizontal axis indicated at 61. In this particular embodiment of the invention, the vertical gyroscope 18 may be similar to the one disclosed in U.S. Patent No. 2,485,552, issued October 25, 1949, to E. F. Aumuller and assigned to the same assignee as the present invention.

Curved background member or mask 16, visible from the front of the instrument, is mounted as by arm 19 in a fixed position with respect to the roll gimbal 38. Mask 16 has mounted thereon diametrically opposed bank indexes 13 and 34. Meter movement 37 or other suitable motive means is mounted behind the mask 16 and is supported by the roll gimbal 38 of the vertical gyro 18 such that the center line of the meter movement is coaxial with the roll axis of the gyro. The roll axis of the gyro 18 may be parallel to a longitudinal axis of the aircraft in which the gyro is located. Meter movement 37 receives electrical signals through connection 39 and produces a mechanical movement in accordance with said signals to rotate the steering pointer index or element 33 connected to the meter movement. The end of the steering pointer index 33 remote from the meter movement bends around the mask 16 such that it is visible from the front of the instrument.

Extending across the mask 16 such that it is also visible from the front of the instrument is one end of horizon bar 12 indicating pitch and roll of the aircraft. The other end of horizon bar 12 is coupled to the vertical gyro 18 as disclosed in the above cited Patent 2,485,552.

The front of the casing 11 is provided with a bank angle scale 15 at the top of the instrument surrounding the mask 16 and concentric therewith. Horizontal diametrically disposed stationary indexes 17—17' are also concentric with said mask 16 and mounted on the front of the casing 11. Provided in front of mask 16 is a miniature airplane symbol 14 pivotally mounted to move vertically with respect to the casing 11.

An annular compass card 20 having a heading scale or indicia thereon is at least partially visible through a window from the front of the instrument 10 and may be mounted for rotation concentrically about said mask 16. A heading selector index or element 24 which may be a transparent annular plastic member is concentrically mounted for rotation with the compass card 20. Provided on the face of casing 11 is a window 27 through which may be seen the reciprocal heading indicia carried by the compass card 20 indicating the reciprocal of the aircraft heading. Also mounted on the front of the casing 11 is a fixed vertical reference or lubber line 23 adjacent to and cooperative with said compass card.

The system shown in Fig. 1 includes a directional gyroscope 21 having a pick-off 28, the electrical output of which is fed to servo system 29 producing at its output a shaft rotation representative of the electrical signal applied at its input. The output of servo system 29 through appropriate drive means 22 and gearing 32 rotates the compass card 20. The output of servo system 29 also provides one input to the differential 30.

On the face of instrument 10 there is provided a heading selector knob 25 which has an "in" and an "out" position. In its "in" position it is frictionally held with respect to the casing 11 by clutch 31. In its "out" position, the heading selector knob 25 is connected by clutch 31 through suitable gearing to indicator 26 which displays the selected heading. When the heading selector knob 25 is in its "out" position it also provides one input to the mechanical differential 30. The output of differential 30 is connected by suitable gearing 35 to ring gear 36 which is drivably coupled to heading selector index 24.

The system of Fig. 1 includes an angle of attack sensor 45 which produces at its output an electrical signal indicative of the angle of attack of the aircraft. The output of sensor 45 is fed to the pitch attitude trim adjustment 47 having a knob 47' thereon for electrically adding to or subtracting from the output of angle of attack sensor 45. The output of component 47 is fed to meter movement 44 to effect the mechanical movement of airplane symbol 14.

There is also provided in the system of Fig. 1 an altitude control 49 which may be a barometric type producing signals in accordance with the altitude of the aircraft. The output of component 49 is fed through a switch to demodulator 50 to the upper and middle contacts of switch 48, indicated as F.I. for flight instruments and LOC. for localizer respectively.

Glide slope radio receiver 51 is provided with an antenna and supplies its output to glide slope trim component 52. Component 52 is provided with an adjusting knob 52'. The output of glide slope trim component 52 is fed to the lower contact of switch 48 marked APP. indicating approach.

The movable contact of switch 48 is connected through the combining circuit indicated generally at 46 to the output of pitch attitude trim component 47 and thence to the input of meter movement 44.

Localizer radio receiver 41 is provided with an antenna and has its output directly connected to the middle contact marked LOC. for localizer in the drawing of the switch 42. The output of localizer 41 is also connected through resistor 43 to the lower contact, marked APP. for approach, of the switch 42. The upper contact, marked F.I. for flight instrument, of the switch 42 is a dummy contact and is provided with no output. The moving contact of switch 42 is connected through reversing switch 40 to meter movement 37 by lead 39.

In the operation of the system shown in Figs. 1 and 2 when the aircraft banks about the roll axis, the spin axis of gyro 18 remains vertical, causing the mask 16 and the horizon bar 12 to rotate with respect to the stationary indexes such as 17—17' and 15 indicating the amount of roll. As the pitch of the aircraft changes, the horizon bar 12 rotates about the horizontal axis of gyro 18 causing the horizon bar 12 to move in a vertical direction across the face of mask 16 and to indicate pitch by its vertical relation with the indexes 17—17'. In normal level flight attitude, the horizon bar 12 preferably lies coincident with fixed indexes 17—17' and with the laterally extending wings of miniature airplane symbol 14.

The signals produced by the directional gyroscope 21 and fed through servo system 29 and gearing 32 rotate the compass card 20 such that the compass bearing under the lubber line 23 indicates the actual heading of the aircraft. The directional output of servo system 29 also moves index 24 synchronously with the movement of the compass card 20 when the heading selector knob 25 is in its "in" position and frictionally prevented from rotating by clutch 31. When heading selector knob 25 is pulled out in its disengaged position through clutch 31, it may be turned to vary the relative position between the index 24 and compass card 20. The heading selected by the knob 25 is indicated at the window 26.

The difference between the actual compass heading and the selected heading, i.e. heading error, is displayed by the setting of the heading selector index 24 with respect to the vertical lubber line 23. The inputs to the differential 30 consisting of a directional reference signal and the heading select signal produce an output from the differential 30 which will displace the heading selector index 24 in a direction and for a number of degrees indicated on the compass card of the instrument in accordance with the sense and magnitude of the difference between the actual aircraft heading and the selected or desired heading of the radio course.

Localizer radio receiver 41 receives a signal from a beam disposed in a vertical plane with the centerline thereof aligned with the landing strip or with a desired navigational heading. The received signal is proportional to the position and displacement of the aircraft with respect to the centerline of the beam. This signal may be fed through the switch 42 in its localizer setting and through reversing switch 40 to the meter movement 37 which is mounted on the gimbal 38 of the vertical gyro 18. Mounting the center line of the meter movement 37 coaxial with the roll axis of the vertical gyro 18 effectively stabilizes the meter movement in roll and the output of the meter movement will be a function of the direction and magnitude of the roll angle of the aircraft and the electrical signal input to the meter movement. The pointer 33 positionably coupled to the meter movement 37 is thus actuated not only by the movement of meter 37 but is also stabilized in roll by the vertical gyro 18 and its gimbal 38, such that the pointer indicates a function of the roll of the aircraft and the electrical signal input to meter movement 37. Therefore, the movement given to the index 33 is effectively the algebraic summation of the position and displacement of the aircraft with respect to the radio beam as indicated by the meter movement 37 and the direction and magnitude of the roll angle of the aircraft as determined from the vertical gyro 18. In operation, the visible portion of steering pointer 33 moves circumferentially around mask 16 and is cooperative with the heading selector index 24, the compass card 20, the lubber line 23, and roll index 34.

By positioning the control switch 42 which is ganged to control switch 48, flight instruments, localizer or approach positions may be selected. In the LOC. position, the meter movement will be actuated by the electrical signal received from the localizer receiver 41. When so energized the meter movement displaces the roll stabilized steering pointer 33 proportional to the magnitude and direction of the localizer radio deviation displacement signal. Since the localizer receiver measures the magnitude and direction of the deviation of the aircraft from the center of the radio beam or radio defined flight path, this signal when used as an input to the meter movement 37 causes it to actuate the steering indicator 33 such that the indicator moves to the right or to the left of its neutral position as the aircraft moves to the right or to the left of the radio-defined course. With the meter movement 37 mounted on the roll gimbal 38 of the vertical gyro 18, the visible indication to the pilot is a movement of the steering pointer 33 that is the algebraic summation of a function of the position and movement of the aircraft with respect to the centerline of the radio beam and the roll attitude of the craft.

The signal to the meter movement 37 is desensitized by the selected resistor 43 to compensate for system instability at close range. The localizer positions of the control switch 42 may be adapted to blue right or blue left by the operation of reversing switch 40.

A small dot 34 or other suitable indication is located on the mask 16 diametrically opposite the upper bank index 13 cooperating with the steering indicator 33 to indicate the magnitude of the radio displacement signal as a function of the distance between the dot 34 and the steering indicator 33. When the meter movement 37 is unenergized, the visible element of the steering indicator 33 will be aligned with the lower roll index 34 and diametrically opposite the upper bank index 13 on the mask 16.

In the embodiment of the invention illustrated in Fig. 1, the selected heading of the radio flight path is 28° as indicated by the drum counter 26 and the position of the heading selector index 24. The actual heading as indicated under the lubber line 23 is 350°. Since the steering indicator 33 is stabilized with respect to the earth's horizon, it will appear to rotate counterclockwise when the aircraft is banked to the right. Thus, to initiate alignment of the steering indicator 33 with the heading selector index 24, the aircraft must be banked to the right such that the algebraic summation of the roll angle of the aircraft and the radio displacement from the desired heading will actuate the meter movement 37 to align the steering index 33 with the heading selector index 24. As the aircraft assumes the desired roll attitude for say a coordinated turn, it will execute a turn towards the new radio-defined heading and the heading selector index 24 and the compass card 20, which is slaved to the directional reference 21, will indicate progressively less and less heading error as the craft turns towards the new heading. Thus, by maintaining alignment of the steering pointer 33 with the heading selector index 24, the craft is flown along a substantially asymptotic flight path to the preselected radio heading.

In utilizing the flight indications afforded with the present invention, it may be desirable to effect a turn of the aircraft to a new radio-defined heading lying at a considerably greater heading error angle than the maximum safe bank angle of the aircraft. For instance, it may be desired to turn the aircraft through an 80° angle to bring it upon a new heading. However, maximum safe bank angle based upon standard safety procedures in executing flight maneuvers may preclude banking the aircraft more than 25°. In this event, the heading selector index 24 is rotated by an appropriate amount, i.e. 80°, and the aircraft is then banked in the proper direction so as to bring the steering indicator 33 to the maximum safe bank angle, i.e. 25°. Due to the bank angle of the aircraft, a turn will be initiated and the aircraft will approach the new heading. The heading selector index 24 in response to the turn of the aircraft will indicate progressively less and less heading error. By maintaining the aircraft at the 25° bank angle, the pilot will cause the indication of the heading error to gradually diminish from 80° until it approaches and is 25°. At that time the heading selector index 24, now reading 25°, is aligned with the steering indicator 33 and is maintained aligned therewith until the new radio defined heading is achieved by aligning both indexes with the lubber line. From the point when the steering indicator and the heading selector index are aligned, the pilot merely maintains alignment in the same manner as has been previously described in connection with the execution of turns to the smaller angles.

Referring again to Fig. 1, the operation of the horizon bar 12 has previously been described with relation to the fixed markers 17 and 17' only. The operation of the horizon bar 12 and miniature airplane symbol 14 will now be described with relation to each other. The symbolic miniature airplane 14 is positionable in the vertical direction by a suitable transducer such as a meter movement 44. The magnitude and direction of the input signal to the meter movement 44 determines the magnitude and direction of the vertical displacement of the miniature airplane symbol 14 with respect to fixed markers 17—17' and horizon bar 12. In one embodiment of the invention, an angle of attack sensor 45 generates an electrical signal that is a function of the angle of attack of the airframe and transmits the signal to meter movement 44 positioning the miniature airplane symbol 14. A convention pitch attitude trim adjustment device 47 is also included in the circuit for initially aligning the horizon bar 12 and the miniature airplane symbol 14 primarily to adjust for parallax. With horizon bar 12 indicating the pitch of the aircraft and the miniature airplane symbol 14 actuated as a function of the angle of attack, the distance between the horizon bar and the miniature airplane symbol presents a function of flight path angle, since pitch minus angle of attack is equivalent to flight path angle. Increasing pitch attitude and angle of attack are indicated by a downward displacement of horizon bar 12 and miniature airplane symbol 14 with respect to casing 11.

The vertical axis control switch 48 which is ganged mechanically to the lateral axis control switch 42 and may also be adjusted to any one of three positions; flight instruments, localizer, or approach. Depending upon the positioning of the control switch 48, the meter movement 44 may be energized by a signal that is a function of angle of attack or by a signal that is a function of angle of attack combined with an additional signal. This may be accomplished, for example, by combining the signal from a conventional altitude sensor in a suitable summation circuit 46 and applying the combined signal through lead 62 to meter movement 44. In the embodiment shown, altitude signals may be generated in an altitude control sensor 49, demodulated if necessary in demodulator 50, and transmitted through control switch 48 to summation circuit 46, where the altitude signal is combined with the angle of attack signal to actuate meter movement 44 as the algebraic summation thereof. An increase in the altitude error, caused by the aircraft climbing above the reference altitude, serves to move the miniature airplane symbol 14 upwards with respect to the casing 11.

In a similar manner vertical radio displacement signals may be generated in a glide slope receiver 51, for example, that has an appropriate trim positioning potentiometer 52 and applied through control switch 48 to summation circuit 46 where the radio glide slope signal is algebraically summed with the angle of attack signal to position the miniature airplane 14 as a combination thereof. When the aircraft is above the radio glide slope on course position, the corresponding radio signal serves to displace the miniature airplane symbol 14 upwards with respect to the casing 11.

The information from glide slope radio receiver 51 indicates the displacement of the aircraft from a radio beam in an inclined plane usually defining a glide path. The miniature airplane 14 is thus positionable as a function of angle of attack solely, when the control switch 48 is in the flight instruments or localizer position with the altitude control disconnected; a function of angle of attack plus altitude control; and a function of angle of attack and radio displacement from the glide path radio beam when the switch is in the approach position.

If so desired in the lateral axis, the heading selector index 24 could be ignored or eliminated from the presentation. The operation of the instrument would then require that the steering pointer 33 be aligned with the selected heading as indicated on the rotatable compass card 20 and be maintained aligned therewith until the steering indicator 33, selected heading and lubber line 23 coincide. This type of operation would be particularly advantageous in Ground Controlled Approaches, for example, where the pilot might be desirous of flying heading changes visually since corrections are given to him rapidly and manual heading selection by use of a knob or index would limit the time available to the pilot to make the heading changes whereas visual matching of the indicators could be accomplished rapidly with the pilot maintaining his hands on the aircraft controls.

Referring now to Fig. 3, a typical localizer turn-on sequence might be as follows. The first picture on the left indicates the pilot is flying parallel to the beam on the reference radio defined heading with the control switch in the "flight instruments" position. When the blue right condition and the localizer position are selected, the steering pointer deflects to the dashed position shown. This indicates to the pilot that he should roll to the left, to cancel out the radio error signal. As the pilot rolls to the left in the second picture, the steering pointer moves to the left. The heading selector index then moves to the right while the pilot continues to match the steering pointer to the heading selector index. At the steady state intercept heading shown in the third picture, the radio signal and the bank angle equal the heading error, thus, the steering pointer and the heading error indicator are aligned at which time the aircraft is in level flight. As the plane approaches the beam as illustrated in the fourth picture, the decreasing radio error signal calls for a right bank and indicates to the pilot that the plane should bank to the right, since the steering pointer has gone faster to the left than the heading selector index. When the pilot is aligned on the course along the radio beam, the steering pointer and the heading selector index are aligned with the vertical lubber line and the plane is in level flight as indicated in the last picture.

Another embodiment of the present invention is shown in Fig. 4 in which the structure and operation in the vertical or pitch axis is similar to that described for the embodiment of Fig. 1. In this embodiment of the invention, the vertical gyro 18, horizon bar 12, miniature airplane symbol 14, and fixed indexes 17—17' and 15 may be similar to the elements described in the embodiment shown in Fig. 1. Mask 16 is visible from the front of the instrument and is positionably constructed as described in the embodiment of Fig. 1. Lower bank index or roll pointer 53 is mounted on the face of mask 16 and diametrically disposed thereto is upper bank index 13.

A vertical index 54 is visible from the front of the instrument and is similar to the lubber line of Fig. 1. Extending to either side of the vertical index 54 is a graduated scale 55 which may be a linear or non-linear function of heading. In the embodiment shown, the graduations indicate approximately 10° heading differential per graduation.

An azimuth error indicator 56 is also visible from the front of the instrument and is cooperatively mounted with respect to the graduated heading scale 55, vertical index 54 and roll pointer 53. The azimuth error indicator 56 is connected to and actuated by meter movement 57 or other suitable transducer. The meter movement 57 is electrically connected through a suitable summation circuit 46 and through a reversing switch to control switch 58. The movable contact of control switch 58 may be connected to any one of three contacts marked F.I., LOC., and APP. The operation of control switch 58 and the reversing switch have been previously described in conjunction with Figure 1. When the movable contact of control switch 58 is connected to the contact marked LOC., the control switch 58 is electrically connected to localizer receiver 59 which is provided with a suitable antenna. When the movable contact arm of control switch 58 is connected to the lower contact marked APP., it is connected through selected resistor 43 to localizer receiver 59.

The meter movement 57 is also electrically connected through summation circuit 46' to heading selector 60. The heading selector 60 may be mechanically connected to a knob having a selected heading dial 26 attached thereto. The heading selector 60 is also connected to the pick-off of directional gyro 21 such as a synchro pick-off. The directional gyro and heading selector configuration may be a synchro pick-off with a differential synchro arrangement similar to that described in U.S. Patent No. 2,613,352, issued October 7, 1952, to S. Kellogg, 2nd, and assigned to the same assignee as the present invention. The directional gyro 21, selected heading dial 26 with its adjusting knob and heading selector 60 are equivalent to the units described in Fig. 1 with the exception that the output of the heading selector 60 is an electrical rather than a mechanical output.

In the operation of the system shown in Fig. 4 the roll pointer 53 is a true indicator of the amount of roll of the aircraft located at the bottom of the instrument rather than at the top. When the roll pointer 53 is aligned with the vertical index 54 at the bottom of the instrument, the aircraft is in level flight.

Signals from the vertical radio beam which define the radio beam heading or flight path are received by the antenna of the localizer receiver 59 and transmitted through said receiver to the fixed contacts of control switch 58. Depending upon the positioning of the movable contact of control switch 58, the meter movement 57 will receive either no localizer signal if the movable contact is in the F.I. position; or the true localizer signal if the movable contact is in the LOC. position; or an attenuated version of the localizer signal if the movable contact is in the APP. position similar to the operation described in Fig. 1. The output from the control switch 58 is then transmitted through a reversing switch to summation circuit 46' to actuate the meter movement 57. The magnitude of the localizer signal is indicative of the amount of displacement of the aircraft from the centerline of the radio beam, and the polarity of the signal is indicative of the position of the beam with respect to the aircraft. If the aircraft is to the right of the beam, the azimuth error indicator 56 is deflected to the left relative to the case 11.

The output from the directional gyro 21 and its pick-off supplies a continuous heading reference that is transmitted to the heading selector 60 such that a desired heading reference may be attained by means of the heading selector knob 63 and selected heading dial 26. The output of the heading selector 60, which is the desired heading that is continuously being referenced by the directional gyro 21, is introduced through summation circuit 46' to meter movement 57. The output signal of the heading selector 60 has a magnitude proportional to the displacement from the selected heading and a polarity proportional to the position of the selected heading with respect to the aircraft. If the selected heading is to the right of the actual aircraft heading, the pointer 56 is deflected to the right relative to the case 11.

The magnitude and polarity of the summated electrical signal from summation circuit 46' actuates meter movement 57 to position azimuth error indicator 56. The azimuth error indicator 56 is cooperatively mounted with respect to the graduated heading scale 55 and positionable therewith in proportion to the actuation induced by meter movement 57. Depending upon the position of control switch 58, the position of azimuth error indicator 56 indicates the algebraic summation of deviations in aircraft heading and displacement from a radio-defined flight path.

With the heading signal being supplied continuously to the meter movement 57, by positioning the control switch 58 a choice of signals may be introduced into meter movement 57 through summation circuit 46'. With the movable contact of control switch 58 in the F.I. position, the azimuth error indicator is positioned by the heading signal only. With the movable contact of control switch 58 in the LOC. position or the APP. position, the position of azimuth error indicator 56 is proportional to the combination of heading and localizer inputs such that the azimuth error indicator 56 is positionable along the graduated scale 55 in proportion to the magnitude and direction of heading deviation and radio beam displacement.

The cooperative action of the roll pointer 53 and azimuth error indicator 56 is then similar to that described for Fig. 1. That is, upon selection of a desired heading generally determined by the position of a radio beam, the roll pointer 53 at the bottom of the horizon mask 16 and the azimuth error indicator 56 are aligned by the pilot's rolling the airplane in order to match the roll pointer 53 with the azimuth error indicator 56 and he then maintains alignment until both indexes are aligned with the common vertical index 54 at which time the aircraft is in level flight and on the radio-defined selected heading. This has been accomplished by an asymptotic approach to the selected radio heading.

The particular embodiment shown in Fig. 4 has the advantage that the director sensing is such that a right deflection means turn to the right, and also that the bottom bank index has the desirable psychological sensing of having the pointer 53 follow the stick position, i.e., right stick moves the index to the right. A fly right localizer signal will also cause the indicator 56 to move to the right, if blue right or approach has been selected on the selector switch. To obtain flight director operation the pilot rolls the aircraft until the bottom bank index or roll pointer points to the director index or azimuth error indicator as explained previously.

In the vertical plane, about the pitch axis, the operation is similar to that described for Fig. 1 in which the movable airplane is actuated by a meter movement, mounted on the side of the instrument, in such a manner that the airplane can move up or down. Inputs to this meter movement could be angle of attack plus altitude control output or glide slope signal for optimum flight director performance or simply altitude control or glide slope signal. Thus, the horizon presentation would provide for flight path angle control, altitude control or glide slope coupling. In the former two cases, the pilot would place the center of the airplane on the pitch bar. In the case of glide slope coupling using flight path angle control, a bias would be imposed on the airplane when the approach position was selected in order to provide a reference flight path angle corresponding to the decent path of the glide slope, i.e., normally 2½°.

Thus, the operations of the indicators embodying the present invention, are as follows. When the instrument is used as an artificial horizon and compass, there is no departure from existing procedures of using an artificial horizon and compass indication, except for the incorporation of flight path angle. This latter feature is equivalent to automatic indexing of the airplane, instead of the present conventional manual method provided. The difference between the position of the airplane and the bar indicates the flight path angle. Zero flight path angle is indicated if the airplane coincides with the bar. Thus a level flight reference is provided for the pilot regardless of flap position or airspeed.

When the instrument is used as a flight director, in heading control, the pilot initiates a turn by rolling in the desired direction. When the reference heading appears visible through the window, the lateral control element is matched to this heading. Thus, the bank angle matches the heading error degree for degree. The use of the heading selector is optional. It is obvious that the bank limits and heading error at the time of matching are at the discretion of the pilot. The sensing of the lateral control needle may be the same as that of conventional rate of turn needle sensing, i.e., right stick motion produces right motion of the element.

When using the instrument as a flight director in flying the localizer or on the range or when flying any radio beam, the pilot would probably set up the reference heading and fly to intercept the course and then select the appropriate radio position with the selector switch. The lateral element is then matched with the heading index for an asymptotic approach to the heading of the selected radio defined flight path.

Again, as a flight director when flying the flight path angle indication on altitude control or glide slope, the pilot would keep the airplane coincident with the pitch bar. Altitude control in this case is therefore consistent with flying a zero flight path angle. For glide slope coupling where the pilot desires to match the miniature airplane symbol to the horizon bar, a bias of the miniature airplane symbol of 2½° is required since the flight path angle usually associated with the glide slope is minus 2½°. This bias may be inserted to automatically actuate the miniature airplane symbol when the APP. position is selected in a conventional manner that is not shown or the pilot may insert the bias by positioning the glide slope trim manual adjustment. If the bias adjustment is not operated then the pilot must maintain the miniature airplane symbol below the horizon bar by an amount equivalent to 2½°.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An aircraft flight indicating instrument comprising means for providing a signal in accordance with the displacement of the craft from a radio-defined flight path, means for providing a signal in accordance with a first attitude condition of the aircraft, means for providing a signal in accordance with a second attitude condition of the aircraft, a common fixed reference index, means including a first moveable index positionable with respect to said common index in accordance with signals from two of said signal providing means, means including a second moveable index positionable with respect to said common index in accordance with a signal from the third signal providing means, and said moveable indexes being constructed for mutual alignment with each other and also with said common index in accordance with said aircraft attitude and radio signals.

2. An aircraft flight indicating instrument comprising means for providing a signal in accordance with the displacement of the craft from a radio-defined flight path, means for providing a signal in accordance with the pitch attitude of the aircraft, means for providing a signal in accordance with the angle of attack of the aircraft, a common fixed reference index, means including a first moveable index positionable with respect to said common index in accordance with signals from two of said signal providing means, means including a second moveable index positionable with respect to said common index in accordance with a signal from the third signal providing means, and said moveable indexes being constructed for mutual alignment with each other and also with said common index in accordance with said aircraft attitude and radio signals.

3. An aircraft flight indicating instrument comprising means for providing a signal in accordance with the displacement of the craft from a radio-defined flight path, means for providing a signal in accordance with the roll attitude of the aircraft, means for providing a signal in accordance with the heading of the aircraft, a common fixed reference index, means including a first moveable index positionable with respect to said common index in accordance with signals from two of said signal providing means, means including a second moveable index positionable with respect to said common index in accordance with a signal from the third signal providing means, and said moveable indexes being constructed for mutual alignment with each other and also with said common index in accordance with said aircraft attitude and radio signals.

4. An aircraft flight indicating instrument comprising a first moveable index, a second moveable index, a common fixed reference index, said moveable indexes being mounted for alignment with respect to each other and also with respect to said common index, means for positioning said first moveable index relative to said common index in accordance with the roll attitude of the aircraft and the displacement of the aircraft from a radio-defined flight path, and means for positioning said second index relative to said common index in accordance with the heading of said aircraft whereby an asymptotic approach to a desired heading may be effected by controlling the roll attitude of the aircraft in a manner to maintain alignment between said first and second indexes, said desired heading being attained when said first and second indexes are both aligned with said common index.

5. A steering aid system for manually piloted dirigible craft comprising a first scale, means for moving said scale in accordance with the heading of a dirigible craft, a moveable index cooperable with said scale, means for positioning said moveable index in accordance with the summation of the deviation of the craft from a preselected radio flight path and the roll attitude of the craft, and a common fixed index cooperable with said scale and moveable index whereby an asymptotic approach to a preselected heading may be effected by controlling the roll attitude of the aircraft to maintain alignment of said scale and moveable index until they align with said common fixed index.

6. An aircraft flight indicating instrument comprising a first scale, means for moving said scale in accordance with the heading of a dirigible craft, a moveable index cooperable with said scale, means for moving said moveable index in accordance with the summation of the deviation of the craft from a preselected radio beam and the roll attitude of the craft, a second index moveable with said scale, means for selectively changing the relative position of said second index with respect to said scale, and a common fixed index cooperable with said scale and said first and second moveable indexes whereby a substantially asymptotic flight approach to said preselected heading will be attained by progressive flight corrections in roll necessary to effect and maintain radially coextensive alignment of said first moveable index with said second moveable index, until said moveable indexes align with said common fixed index.

7. In an aircraft flight indicating system the combination of a first index adapted for movement in response to the roll of the aircraft and displacement from a radio-defined flight path of said aircraft, a directional reference, a rotatable azimuthal heading scale adapted to respond to said directional reference, a common fixed index adapted to cooperate with said azimuthal heading scale to indicate the heading of the aircraft, the sense of rotation of said heading scale being consistent with the direction of movement of said first index in response to banking of said aircraft, a second moveable index indicating the heading error of said aircraft with respect to a preselected radio flight path as a deflection from said fixed common index, whereby a substantially asymptotic flight approach to said preselected radio-defined heading will be attained by progressive flight corrections in roll necessary to effect and maintain radially coextensive alignment of said first index with said second index.

8. A system as claimed in claim 7, including means for selectively changing the relative position of said second index with respect to said scale in which the movement of the scale is so related to the movement of the first moveable index that when the first and second indexes are aligned, the craft is correctly banked for an asymptotic approach to the heading indicated on the scale by the second index.

9. In an aircraft flight indicating system, the combination of an indicator having an element adapted for movement in one degree of freedom, a common reference index, a roll reference device, radio means including a receiver on said craft supplying signals corresponding to lateral craft displacement from a predetermined radio flight path, means for deflecting said element relative to said common index in response to the deviation of said aircraft from said roll and radio displacement reference devices, a heading reference device, a heading scale, means responsive to said heading device for orienting said heading scale relative to said common index in accordance with the heading of said aircraft and in a direction consistent in sense with the direction of craft turning produced by the direction of roll thereof, and an indicator means positionable with respect to said heading scale for indicating the heading error between an existing aircraft heading and a desired radio defined heading as a deflection thereof from said common index and thereafter positionable with said scale, whereby a substantially asymptotic flight approach to said desired heading will be obtained by a progressive flight correction in roll necessary to effect and maintain alignment of said element with said heading error indicator means.

10. In an aircraft flight indicating system the combination of an element rotatably adapted for movement about an axis representative of the roll axis of the aircraft, a common index, a roll reference device, a localizer reference device, means for rotating said element for a distance and in a direction from said common index in response to the magnitude and direction of deviation of said aircraft from said roll reference device and said localizer reference device, a directional reference device, a rotatable compass card mounted in concentric relation to said element, means for rotating said compass card for a distance and in a direction from said common index consistent with the direction of turning of said aircraft produced by the direction of rolling thereof in response to the deviation of the craft from said directional reference device, and means for indicating the heading error of said aircraft with respect to a selected radio flight path as a deflection thereof from said common index, whereby a substantially asymptotic path of flight to said selected heading will be obtained by controlling the progressive roll attitudes of said aircraft necessary to effect and maintain radial alignment of said element with said heading error indicator means.

11. In a flight instrument for aiding steering of a craft in azimuth along a radio defined course, the combination with an attitude gyroscope, and means for generating a sense signal when the craft is off the course to the right or left proportional to the amount of off course, a first movable index, a second movable index, a common fixed reference index, said moveable indexes being adapted in said instrument in a manner such that they may be mutually aligned with respect to each other and also with respect to said common index, means for positioning said first index relative to said common index in accordance with the roll attitude of the aircraft in part controlled by said gyroscope and in part by said supplemented sense signal, and means for positioning said second index relative to said common index in accordance with a desired heading of the aircraft and thereafter for positioning the same in accordance with changes in the heading of the aircraft, whereby an asymptotic approach to said desired radio flight path may be effected by controlling the roll attitude of the aircraft in the manner to maintain alignment between said first and second indexes.

12. In an aircraft flight indicating instrument in combination an attitude indicating instrument having a rotor spinning about a normally vertical axis, gimbal means universally supporting said rotor in said aircraft for freedom of movement about the roll and pitch axes thereof, an index mounted on said gimbal for movement therewith about said roll axis, and means also mounted on said gimbal for additionally moving said index about said roll axis in accordance with the movement of said craft with respect to a radio-defined ground track.

13. The combination as set forth in claim 12 wherein said last mentioned means includes a two-part motive means, one part mounted on said gimbal and the other part carrying said index, and means for energizing said motive means in accordance with the movement of the craft with respect to a radio-defined ground track.

14. The combination as set forth in claim 13 wherein said motive means comprises a meter movement.

15. An aircraft flight indicating instrument comprising a first moveable index, a second moveable index, a common fixed reference index, said moveable indexes being mounted for alignment with respect to each other and also with respect to said common index, means for positioning said first moveable index relative to said common index in accordance with the roll attitude of the aircraft, and means for positioning said second index relative to said common index in accordance with the heading of the aircraft and the displacement of the aircraft from a radio-defined ground track whereby an asymptotic approach to a desired radio-defined heading may be effected by controlling the roll attitude of the aircraft in a manner to maintain alignment between said first and second indexes, said desired heading being attained when said first and second indexes are both aligned with said common index.

16. An aircraft flight indicating instrument comprising a fixed reference index, a fixed scale extending in opposite directions from said reference index indicating deviations of said aircraft from an existing heading and radio-defined ground track, said reference index representing zero deviation, a bank index moveable relative to said reference index and scale in accordance with the bank angle of said aircraft, an azimuth error indicator moveable relative to said scale indicating a departure in the heading of said aircraft from said existing heading and radio-defined ground track, and means for thereafter positioning said azimuth error indicator in accordance with changes in the heading of said aircraft and the displacement of the aircraft from a radio-defined ground track, whereby an asymptotic approach to said desired heading may be effected by controlling the bank angle of the craft in a manner to maintain alignment between said bank index and said azimuth error indicator.

17. An aircraft flight indicating instrument, comprising a fixed reference index, a fixed scale extending in opposed directions from said reference index calibrated as a non-linear function of deviations of said aircraft from an existing heading and radio-defined ground track, said reference index representing zero deviation, a bank index moveable relative to said reference index and scale in accordance with the bank angle of said aircraft, and azimuth error indicator moveable relative to said scale indicating a departure in the heading of said aircraft from said existing heading and radio-defined ground track, and means for thereafter positioning said azimuth error indicator in accordance with changes in the heading of said aircraft and the displacement of the aircraft from a radio-defined ground track wherein said positioning means includes a corresponding nonlinear functional drive, whereby a asymptotic approach to said desired heading may be effected by controlling the bank angle of the craft in a manner to maintain alignment between said bank index and said azimuth error indicator in which the character of said asymptotic approach to the desired heading is dependent upon said nonlinear function.

18. An aircraft flight indicating instrument comprising a first moveable index, a second moveable index, a common fixed reference index, said moveable indexes being mounted for alignment with respect to each other and also with respect to said common index, means for positioning said first moveable index relative to said common index in accordance with the angle of attack of the aircraft and the displacement of the craft from a radio-defined glide slope, and means for positioning said second index relative to said common index in accordance with the pitch attitude of the aircraft whereby an asymptotic approach to a desired glide slope may be effected by controlling the pitch attitude of the aircraft in a manner to maintain alignment between said first and second indexes, said desired attitude being attained when said first and second indexes are both aligned with said common index.

19. An aircraft flight indicating instrument comprising a first moveable index, a second moveable index, a common fixed reference index, said moveable indexes being mounted for alignment with respect to each other and also with respect to said common index, means for positioning said first moveable index relative to said common index in accordance with the angle of attack of the aircraft and the displacement of the craft from a preselected altitude, and means for positioning said second index relative to said common index in accordance with the pitch attitude of the aircraft whereby a constant altitude may be maintained by controlling the flight path angle of the aircraft in a manner to maintain alignment between said first and second indexes, said desired altitude being maintained with a constant flight path angle when said first and second indexes are both aligned with said common index.

20. In an aircraft flight indicating system, the combination of a means including a first index mounted for movement about a first axis in response to the roll of the aircraft and displacement from a radio-defined ground track of said aircraft; a common vertical reference; means including a rotatable azimuthal heading scale mounted concentrically with said first axis for movement in response to the heading of the aircraft and cooperable with said common vertical reference to indicate the heading of the aircraft, the sense of rotation of said heading scale being consistent with the direction of movement of said first moveable index in response to banking of said aircraft; indicator means for indicating the heading error of said aircraft with respect to a preselected radio-defined ground track as a deflection from said common vertical reference; means including a second index mounted for movement in a vertical plane in response to the angle of attack and displacement from a radio-defined glide slope of said aircraft; a common horizontal reference; and means including a third index mounted for movement in a vertical plane in response to pitch and roll of said aircraft and cooperable with said second index to indicate the flight path angle of said aircraft and also cooperable with said common horizontal reference; whereby a substantially asymptotic flight approach to said desired flight path will be attained by progressive flight attitude corrections to effect alignment of said cooperable elements.

No references cited.

UNITED STATES PATENT OFFICE
CERTIFICATE OF CORRECTION

Patent No. 2,880,414                March 31, 1959

Reuben P. Snodgrass

It is hereby certified that error appears in the printed specification of the above numbered patent requiring correction and that the said Letters Patent should read as corrected below.

Column 13, line 72, strike out "mon fixed reference index, said moveable indexes being"; column 14, line 75, strike out entire line, and substitute instead -- mon fixed reference index, said moveable indexes being --.

Signed and sealed this 29th day of March 1960.

(SEAL)
Attest:

KARL H. AXLINE
Attesting Officer

ROBERT C. WATSON
Commissioner of Patents